US009171423B2

(12) United States Patent
O'Halloran et al.

(10) Patent No.: US 9,171,423 B2
(45) **Date of Patent: *Oct. 27, 2015**

(54) LINEAR SCATTER JACKPOT METHOD AND SYSTEM

(75) Inventors: Terry O'Halloran, Bellevue Hill (AU); Andrew Masen, Kensington (AU)

(73) Assignee: Bally Technologies ANZ PTY LTD, Milperra NSW (AU)

( * ) Notice: Subject to any disclaimer, the term of this patent is extended or adjusted under 35 U.S.C. 154(b) by 1008 days.

This patent is subject to a terminal disclaimer.

(21) Appl. No.: 12/012,230

(22) Filed: Jan. 31, 2008

(65) Prior Publication Data

US 2008/0182653 A1 Jul. 31, 2008

Related U.S. Application Data

(63) Continuation-in-part of application No. 10/591,310, filed as application No. PCT/AU2005/000304 on Mar. 3, 2005, now Pat. No. 8,475,268.

(30) Foreign Application Priority Data

Mar. 3, 2004 (AU) ................................ 2004901061

(51) Int. Cl.
*A63F 13/00* (2014.01)
*G07F 17/32* (2006.01)

(52) U.S. Cl.
CPC ........ *G07F 17/3258* (2013.01); *G07F 17/3244* (2013.01)

(58) Field of Classification Search
CPC .... G07F 17/32; G07F 17/326; G07F 17/3262
USPC .......................................... 463/20, 21, 26, 25
See application file for complete search history.

(56) References Cited

U.S. PATENT DOCUMENTS

| | | | | |
|---|---|---|---|---|
| 6,056,642 | A | 5/2000 | Bennett | |
| 6,093,102 | A | 7/2000 | Bennett | |
| 6,155,925 | A | 12/2000 | Giobbi et al. | 463/20 |
| 6,159,096 | A * | 12/2000 | Yoseloff | 463/20 |
| 6,251,013 | B1 | 6/2001 | Bennett | 463/13 |
| 6,634,941 | B2 | 10/2003 | Olive | 463/16 |
| 2003/0064802 | A1 * | 4/2003 | Rodgers et al. | 463/30 |
| 2003/0216165 | A1 | 11/2003 | Singer et al. | 463/20 |
| 2003/0220134 | A1 | 11/2003 | Walker et al. | |
| 2003/0236116 | A1 * | 12/2003 | Marks et al. | 463/16 |
| 2004/0002373 | A1 * | 1/2004 | Kaminkow | 463/20 |
| 2004/0180714 | A1 * | 9/2004 | Ward | 463/20 |
| 2006/0019738 | A1 | 1/2006 | Baerlocher et al. | |

FOREIGN PATENT DOCUMENTS

| | | | |
|---|---|---|---|
| CA | 2399931 | 8/2002 | |
| EP | 1063622 | 5/2000 | G07F 17/32 |
| WO | WO2005/086018 | 9/2005 | G06F 17/00 |

* cited by examiner

*Primary Examiner* — Allen Chan
(74) *Attorney, Agent, or Firm* — TraskBritt

(57) ABSTRACT

A method for awarding a jackpot, and a corresponding gaming machine and system are disclosed. The jackpot is awarded based upon the presence of scatter symbols appearing in the game outcome in a predefined manner. The jackpot is preferred to be linked across multiple machines. In a preferred form, scatter symbols on one reel may be in an active or inactive state, the jackpot is awarded only if they are in the active state, and the probability of them being in an active state is dependent upon the size of the player's wager, so as to provide linear returns to players.

25 Claims, 3 Drawing Sheets

LINEAR SCATTER JACKPOT METHOD AND SYSTEM

CROSS-REFERENCE TO RELATED APPLICATION

This application is a continuation-in-part of U.S. patent application Ser. No. 10/591,310, filed May 7, 2007, "Linear Scatter Jackpot Method and System," now U.S. Pat. No. 8,475,268, issued Jul. 2, 2013, the entire disclosure of which is hereby incorporated herein by this reference.

TECHNICAL FIELD

This invention relates to the field of casino wagering apparatuses, especially video slot apparatuses and to the provision of jackpots triggered by scattered symbols on a gaming machine, and especially for linear progressive jackpots.

BACKGROUND

In this specification, unless the contrary is expressly stated, where a document, act or item of knowledge is referred to or discussed, this reference or discussion is not an admission that the document, act or item of knowledge, or any combination thereof, was at the priority date, publicly available, known to the public, part of common general knowledge, or known to be relevant to an attempt to solve any problem with which this specification is concerned.

On many gaming machine systems, progressive jackpots are provided. A progressive jackpot is a system in which the total amount of winnings available in a jackpot is incremented by a portion of wagers placed on the game, either placed on the game itself or as a side bet wager on the progressive event. Such a jackpot or decrementing portion thereof may be awarded to a player when the player achieves a particular combination of symbols or the like on the machine, or at a random time. The present invention is concerned with the format where symbols are used to determine a progressive jackpot outcome. While such jackpots may be implemented on single machines, the common implementation of such a game uses a jackpot pooled across many machines (as through a network, either hardwired and/or wireless connection), so that the jackpot becomes relatively large, as it is being funded from multiple machines and is won at reasonable intervals.

The jackpot value in such linked games is generally incremented by a designated portion of each player's wager being added to the pool.

Current gaming regulations in many parts of the world require players to be paid returns in proportion to their bet level. For example, if a player plays a single line gaming machine at 1 credit, and achieves three "X" symbols on a line and a prize of 5 credits is awarded, then it would be expected that a player achieving the same result and playing 2 credits on the same single line game would be awarded 10 credits. This is referred to as linearity and ensures all players are paid prizes that are at least proportionate to their bet level. In some machines, wagering maximum amounts (e.g., 5 credits) will provide an award that may be greater than proportionate on certain outcomes if a 1-credit wager had been made.

In the instance of progressive jackpots, all players are contributing to a common prize pool that can be won by any player at any time. A popular format to win a jackpot prize is called a "symbol-driven link progressive." This format requires that a player must achieve a certain combination on the gaming screen to be awarded a prize or jackpot, or is given the chance to win a jackpot through a bonus game or supplemental event if they achieve this combination.

In order to meet regulations, any jackpot game must provide a linear chance of winning these jackpots, which is accomplished in side bet events by having a single size side bet wager required to play the progressive jackpot event. It is also a challenge to manufacturers to implement the game in such a way that game play is entertaining, as well as the jackpot appearing achievable to the player.

It is an advantage of the preferred embodiment of the present invention to provide a new, symbol-driven jackpot system, which is appealing to players and facilitates linear returns.

DISCLOSURE

In a broad form, the preferred embodiment of the present invention provides a method of providing a jackpot, in which the jackpot is triggered by symbols scattered across the screen and not necessarily confined to a single, predefined payline or one payline of a set of predetermined paylines.

One description of an invention within the generic scope of technology described herein includes a method of playing a jackpot wagering game in a video gaming machine. The gaming machine preferably has a monitor that displays symbols, although mechanical reel systems can be adapted for play with the present technology, especially using highlighting of mechanical reels or supplemental symbols on individual symbols on the mechanical reels. The embodiment will be described without intending a limitation on the scope of claims or the invention, primarily on video displays, for convenience. The method may comprise:

- a player placing a wager on a jackpot game on the gaming machine;
- at least a portion of the wager being used to increment a total amount of the jackpot (e.g., a progressive jackpot or other funded jackpot event);
- determining an amount of the player's wager;
- playing the jackpot game by providing a display of symbols on the monitor, wherein at least some jackpot event symbols (e.g., those specific symbols that are part of the display necessary for attaining a portion of a jackpot payout or the highest jackpot payout) are randomly provided as variable state symbols on the monitor
- The jackpot event symbols may be provided as either active jackpot (e.g., scatter) symbols or inactive jackpot (e.g., preferably scatter) symbols, and only active jackpot event symbols are considered in the determination of jackpot winning events (while fewer than all or no inactive jackpot symbols are considered); and
- wherein display as an active state jackpot event symbol or an inactive jackpot event symbol is probabilistically determined on a basis relative to the determined size of the player's wager relative to a maximum allowable wager allowed in the play of the game and/or the device.

According to one aspect, the present invention provides a method of providing a jackpot in a gaming machine, the machine having multiple simulated reels, and at least one payline, comprising at least the steps of:

(a) determining a player's wager;

(b) playing the game, so that the simulated reels assume a random and preferably specific configuration;

(c) determining if scatter symbols appear across at least selected ones of the reels in a predefined manner and, if so, then paying the jackpot.

The jackpot may be paid by paying in full a jackpot, either on a specific machine or across linked machines; paying part of a jackpot; or allowing the player to play a game that determines if any jackpot amount is won and/or the quantum (portion) of any jackpot won. The specification and claims should be read in consideration of these various aspects of the invention unless the context requires otherwise.

The term "scatter symbols" indicates that such symbols are evaluated for their presence, either anywhere on the screen and/or in only specific locations on the screen, and those specific locations are not limited to only traditional consecutive frame paylines. That is, the scatter symbols need not necessarily only be in connected adjacent frames on the screen, although they may be within such defined specific locations. In a preferred form, the scatter, at least in part, is reliant upon symbols with an active and an inactive state. In the active state, these scatter symbols act as part of the scatter event to award the jackpot. The linearity described in the present technology is provided by making the probability that the symbol is active proportional to the size of the wager. In one form, this may be performed by having a different symbol, which only changes state after the reel is stationary. In an inactive state, these scatter symbols cannot act as part of the analysis for presence of active scatter symbols to determine a jackpot award.

As the probability that each symbol is active on the selected reel is independent of how many scatter symbols are present, this provides a simple, scalable way of ensuring linearity.

According to a second aspect, the present invention provides a gaming machine having multiple simulated reels, the gaming machine including a processor, player wager selection means and a display, and at least one payline, the processor playing a game in accordance with software, the game including the steps of:

(a) receiving a player's wager from the wager selection means;
(b) playing the game, so that the simulated reels are shown in a specific configuration (e.g., on frames, on reels, or in predetermined locations or orientations) on the display;
(c) determining if active scatter symbols appear across the reels in a predefined manner and, if so, then paying the jackpot.

While the preferred embodiment of the present invention may be implemented on a single machine, it is preferably implemented as a linked jackpot arrangement. In a preferred form, each gaming machine determines the outcome of individual game play locally, while contributing incremental credits to a progressive jackpot monitoring system maintained is a central system. The jackpot amount and payouts are managed by the central system. The system may accordingly be managed centrally in essentially the same way as a conventional symbol-driven jackpot system. The linked machines may all be on one site (e.g., a single casino), or on linked sites (e.g., multiple casinos linked together or an Internet casino providing gaming software to a plurality of players' personal computers), both of which are widely practiced for conventional linked jackpot systems.

As games and game types have evolved, different pay methods have been introduced to make games more exciting. One of the most popular is the scatter pay that does not require paylines to reward a player. In a scatter game, the appearance of the scatter symbols anywhere on the screen or in (but not only in) a pre-determined directional pattern (left to right, right to left, adjacent, etc.), pays a prize multiplied by the player's total bet. The scatter feature is generally an addition to payline-based games. The present invention awards a jackpot, or the chance to win a jackpot, based on a scatter combination. This is a game feature that has not previously been used to award a jackpot.

One methodology for devising linearity formats is to ensure players understand how they are potentially being rewarded. As scatters are now an accepted form of paying combination, the present invention takes the simple scatter pay and can add another dimension that retains the existing method of awarding prizes, but introduces another element that is over and above the standard slot game.

According to a third aspect, the present invention can provide a method of providing a jackpot in a gaming machine, the machine having: multiple simulated reels; a plurality of predetermined wagers that can be wagered on the outcome of the simulated reels; and at least one payline, the method comprising at least the steps of:

(a) determining a player's wager, the player's wager being one of plurality of predetermined values of wagers (e.g., 1 unit, 2 units, . . . 100 units, etc.);
(b) playing the game, so that the simulated reels or available frames assume a random but identifiable (with specific symbols distinctly identifiable) or specific configuration (e.g., with specific frames observable, specific locations identifiable, specific patterns of symbols identifiable, etc.);
(c) determining if at least one scatter symbol appears across at least selected ones of the reels or available symbols in a predefined or random manner (e.g., with at least a specific number of active and/or inactive scatter symbols shown) and, if so, then paying at least a portion of the jackpot, the portion paid being dependent on the player's wager.

Preferably, the plurality of predetermined wagers includes wagers from 1 credit to a predetermined maximum number of credits. More preferably, the portion of the jackpot paid is proportional to the ratio of the player's wager to the maximum number of credits allowed in a wager. Even more preferably, the portion of the jackpot paid is directly proportional (or linearly proportional) to the ratio of the player's wager to the maximum wager. Most preferably, the entire jackpot is paid when the player wagers the maximum wager and attains the highest jackpot award event.

According to a fourth aspect of the invention, there may be provided a method of playing a progressive jackpot wagering game in a video gaming machine, the video gaming machine having a monitor that displays symbols in a desired format (e.g., frames, images, symbols and/or virtual reels) having at least one payline or potential distribution of symbols determining awards, the method comprising:

a player placing a wager on a progressive jackpot game on the gaming machine;
at least a portion of the wager being used to increment a total amount of the progressive jackpot;
determining an amount of the player's wager;
playing the progressive jackpot game by providing a display of symbols on the monitor (e.g., with symbols displays and/or virtual reels), wherein scatter symbols are randomly provided as variable state symbols on the display of symbols (e.g., within virtual reels or available frames);
wherein variable state scatter symbols may be provided as either active scatter symbols or inactive scatter symbols, and only active scatter symbols are considered in the determination of progressive jackpot winning events; and
wherein display as an active state scatter symbol versus an inactive state scatter symbol is probabilistically determined on a basis relative to determined size of the player's actual determined wager relative to a maximum allowable wager.

Preferably, a processor determines if scatter symbols appear across the reels in a predefined manner and, if so, then paying the jackpot according to total numbers and/or location of active scatter pay symbols.

According to a fifth aspect of the invention there is provided a method of providing a jackpot in a gaming machine, the gaming machine having multiple simulated reels, and at least one payline, including at least the steps of:

(a) determining a player's wager;

(b) playing the game, so that the simulated reels assume a specific configuration showing symbols across the reels, wherein one or more of the symbols can be a scatter symbol, wherein one or more of the scatter symbols can be a variable state scatter symbol, the variable state being either an active state, whereby the variable state scatter symbol acts as a scatter symbol, or an inactive state, whereby the variable state scatter symbol is not considered to be a scatter symbol, wherein the probability of a variable state scatter symbol having an active state is dependent upon the size of the player's wager; and (c) determining if scatter symbols appear across the reels in a predefined manner and, if so, then paying the jackpot.

According to a sixth aspect of the invention, there is provided a video gaming machine including: a monitor that displays virtual reels having at least one payline; a processor; and a selector for allowing a player to select a wager, the processor playing a game in accordance with software, the game including the steps of:

a player placing the wager on a jackpot game on the gaming machine;

at least a portion of the wager being used to increment a total amount of the jackpot;

determining an amount of the player's wager;

playing the jackpot game by providing a display of symbols on the virtual reels, wherein scatter symbols are randomly provided as variable state symbols on the virtual reels;

wherein variable state scatter symbols may be provided as either active scatter symbols or inactive scatter symbols, and only active scatter symbols are considered in the determination of jackpot winning events; and wherein display as an active state scatter symbol or an inactive state scatter symbol is probabilistically determined on a basis relative to the determined size of the player's wager relative to a maximum allowable wager.

According to a seventh aspect of the invention, there is provided a gaming machine having multiple simulated reels, the gaming machine including a processor, player wager selection means and a display, and at least one payline, the processor playing a game in accordance with software, wherein dependent upon the configuration of reels after game play, one or more reels may include active scatter symbols, and one reel may include a set of symbols that selectively form active or inactive scatter symbols, the jackpot being won by a predetermined combination of active scatter symbols in a game outcome display including one on the one reel, wherein the probability that a scatter symbol is selected as active on the game outcome display is dependent upon the size of the player's wager relative to a maximum possible wager for the machine.

According to an eighth aspect of the invention, there is provided a system for operating a linked jackpot, comprising at least a plurality of gaming machines linked to a central jackpot controller, the central jackpot controller and the gaming machines cooperating to implement the method according to the method of any of the above aspects.

BRIEF DESCRIPTION OF THE DRAWINGS

A preferred embodiment of the invention will now be described, by way of example only, with reference to the accompanying drawings in which.

DETAILED DESCRIPTION OF THE INVENTION

Figure 1:
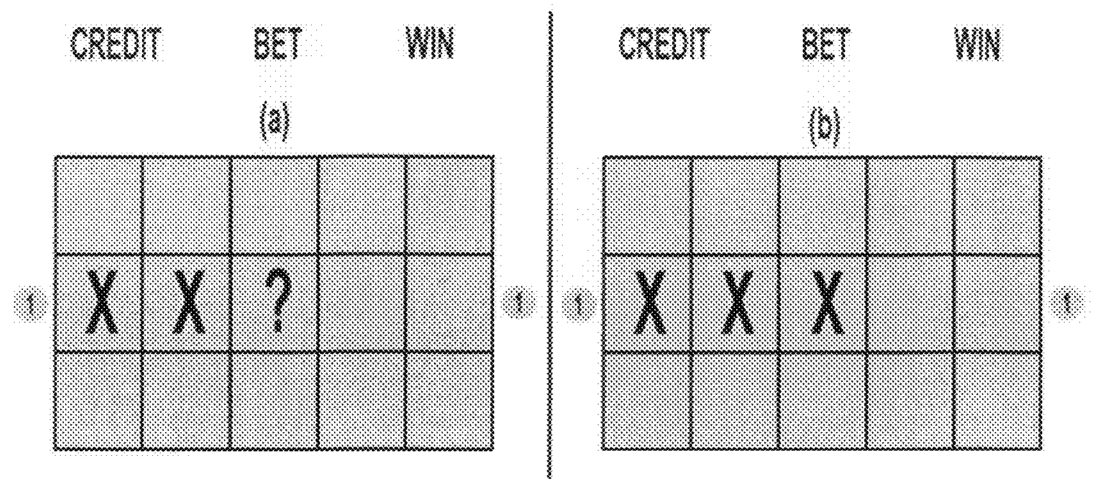
FIG. 1 is an illustration of relevant reel symbols for an implementation of the present invention.

It will be understood that there are a variety of ways to implement the present invention. The present invention may be readily implemented as an additional feature on many existing slot machines, with appropriate modifications to the pay table to take account of incremental contributions to the jackpot. However, the invention will be principally described with reference to a specific non-limiting implementation.

In this embodiment, the scatter symbol used to determine jackpot wins is defined as residing on reels 1, 2 and 3 of a five-reel game. The scatter symbol has an "active" and "inactive" position or mode that is controlled by the processor, such as by being randomly controlled by the processor. The display of the symbol will preferably vary to distinguish between an active or inactive mode, as by highlighting, color changes, animation and the like. In this way, players who make a less than maximum wager will see that if they had made the maximum wager, the jackpot would have been won, or might have been won. While there are other potential embodiments based on this, in this example, the scatter symbols are always active on reels 1 and 2 for maximum exposure to the player. The scatter symbols on reel 3 are replaced by another symbol that, upon appearing on the completed position of the reels, reveals the scatter in an active or inactive position. The chance of revealing an active symbol on the scatter symbol is the player's wager divided by the maximum wager available. Accordingly, when the maximum wager is wagered, all the scatter symbols are active.

The game may be configured in such a way that the base game prize for 3× active symbols is the same as 2× active and an inactive symbol. That is, if the 3× active symbols pay 5 credits/credit wagered on the non-progressive reel game, the 3× scatter symbols with one inactive symbol will pay the same as the resolution with 2× active symbols or pay the same as for 3× active symbols, at the discretion of the game designer. One possible difference between the two events is that the player who gets the three active symbols wins a jackpot, or provides them entry into a feature that will or may award a jackpot. This approach to implementing the invention allows the game to be designed with some mathematically unique and innovative devices that will streamline the game development process and make games more flexible.

The game can also be configured such that the pay table for the underlying reel game is constant whether the scatter symbols× are active or inactive. For example, the paytable can be configured to pay 5 credits per credit wagered for the occurrence of three scatter symbols in a payline. This can be paid irrespective of whether the scatter symbols are active or inactive. Whether the player is also then awarded a jackpot is then dependent on whether the scatter symbols are active or inactive.

An advantage of the preferred embodiment is that the number of scatter symbols appearing on reel 3 (i.e., occupying unique positions on the reel) is independent of possibility of each individual symbol (scatter or otherwise) appearing in the result of a spin. That is, the possibility of each position on the reel appearing in the result of a spin is dependent upon the number of symbols (scatter or otherwise) included on the reel (i.e., the reel length). For example, if the reel has a total length of 75 symbols (including scatter and other symbols), then the probability of any particular symbol appearing in one particular payline is 1 in 75 (this, of course, assumes the reels are not weighted). Therefore, given a particular gaming machine having a maximum bet on a particular game of 500 credits, if the player bets 100 credits, then when a scatter symbol is displayed in the result of reel 3, it has a 20% chance (100/500) of being active when revealed. If that same game was changed to modify the maximum bet, this would not affect the probability of the scatter symbol being active or inactive as it is only dependent on the ratio of the player's wager to the maximum wager possible. Accordingly, the reel strips do not need to be modified.

It will be understood that the designers may select between 1 and n symbols to appear on the reel depending on aesthetics, game presentation or other variables. Any number of these symbols can be nominated as having scatter status and being active or inactive according to the bet/maximum bet chance or ratio as discussed above.

A further game design feature is that this progressive gaming technology or jackpot technology can be developed in a range of formats on a standard slot reel game. While most games are designed in a standard 5×3 matrix, this implementation of the present invention can be readily implemented in any format including at least 3×3, 3×4, 4×4, 3×5, 4×5, 5×5, etc.

FIG. 1 is a representation of what the display on one slot machine would show when the game is being played. In this embodiment where the scatters appear on reels 1, 2 and 3, we have the situation in (a) where active scatters appear on reels 1 and 2 (in this version, scatters may always be active in at least two of the three reels, and the wager determines the probability for activity in the third reel only), and the symbol that will reveal active or inactive (designated by "?") appears on reel 3. While there are many implementations of how this may be presented to the player, the preferred embodiment is that the indicator symbol (e.g., the "?" symbol) will animate to reveal the active scatter symbol or the inactive scatter symbol. It will be appreciated that alternative implementations for the graphic elements are a matter of game designer choice.

The invention could similarly be implemented with, for example, an arrangement in which the symbol remains the same (without indicating an underlying scatter symbol) unless it becomes active, or in which the symbols appearing during the simulated reel spinning have already become active or inactive.

In (b), the "?" symbol has changed state to the active X symbol, and the jackpot is awarded. It will be understood that although the illustration shows the X symbols all appearing on the central pay line, they may equally be on the upper or lower positions on the same reel, as the jackpot is awarded for scattered symbols.

A simplest way of implementing an embodiment of the present technology is described as follows. Assuming that X+1 scatter symbols are needed for the progressive jackpot, wherein X is a positive integer of at least 1 and is preferably 1, 2, 3 or 4, the gaming device will have at least X+1 reels. Each of the X reels is capable of displaying an active status scatter symbol, but one reel is able to display either an active or inactive status scatter symbol, depending upon wager size as described herein. By varying the probability of the active status of the scatter symbol on the single reel that may vary the status of the scatter symbol based on wager size, probabilities for the progressive jackpot wager win are readily linearly proportioned to the relative wager size. Assuming that only one, two, three, four or five credits may be wagered, when the variable status scatter pay symbol appears in the X+1 reel, control of the activity state in direct proportion to the wager size, 20%, 40%, 60%, 80% and 100%, respectively, automatically controls the proportionality of the jackpot bonus win.

It is slightly more complex, but within the skill of the artisan, to have the proportionality resulting from the wager size distributed among more than one reel. For example, if the wager size were 40% of the maximum wager size, probability for active status on the first reel might remain at 100%, probability of active status on the second reel might be 80% and probability on the third reel might be 50%, offering a total outcome probability of 40%, linearly proportional to the size of the initial wager in comparison to the largest possible size.

The probabilities may also be distributed across more than two reels, with the same ultimate effect.

In an alternative embodiment the scatter symbols behave in accordance with the description above, however, the jackpot awarded is varied according to the player's wager. That is, the gaming machine has a plurality of predetermined wagers that can be wagered on the outcome of the simulated reels. This may be from 1 to, say, 5 credits, however, this can be modified according to the requirements of the particular game. The portion of the jackpot paid when the three scatter symbols are displayed as shown in FIG. 1 (*b*) is paid proportional to the ratio of the player's wager to the maximum wager. That is, a wager of 1 credit pays 20% of the jackpot, 2 credits pays 40% of the jackpot, 3 credits pays 60% of the jackpot, 4 credits pays 80% of the jackpot and 5 credits pays 100% of the jackpot. In this embodiment, the jackpot is paid directly proportional and linearly to the ratio of the player's wager to the maximum wager. In other embodiments, the payout is not linear and may be exponential, or the like. For example, a wager of 1 credit may pay 10% of the jackpot, 2 credits 20% of the jackpot, 3 credits 35% of the jackpot, 4 credits 55% of the jackpot and 5 credits 100% of the jackpot. These percentages may be modified in accordance with the specific game requirements and in other embodiments, a 5-credit wager may not pay the entire jackpot amount unless other conditions are met. These could include the requirement for the jackpot to be above a certain dollar amount, the requirement for an additional non-scatter symbol to be included on the payline, and any other desirable criteria. In some embodiments, the scatter symbols are always active and the amount of the wager (i.e., 1, 2, 3, 4 or 5 credits) determines only the percentage payout of the jackpot.

The term "jackpot" as used herein includes at least progressive jackpots, mini jackpots, major jackpots, mega jackpots or any other prize or jackpot that may be associated with electronic gaming machines.

Figure 2A:
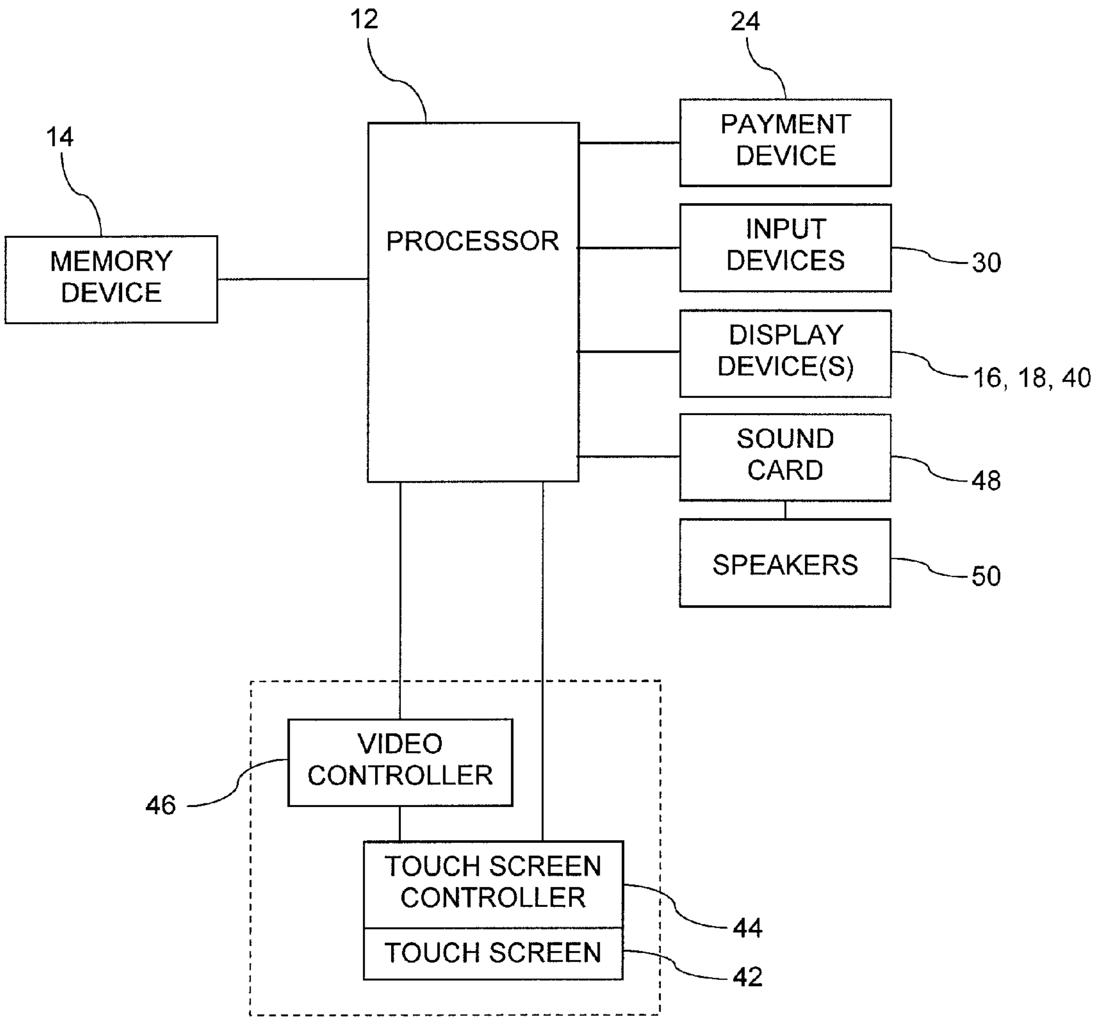
FIG. 2A is a schematic block diagram of the electronic configuration of one embodiment of the gaming device disclosed herein.

In one embodiment, as illustrated in FIG. 2A, the gaming device includes one or more display devices 16, 18, 40 controlled by a processor 12. The display devices 16, 18, 40 are preferably connected or mounted to the cabinet of the gaming device. The embodiment shown in FIG. 2A includes a central display device 16, which displays a primary game. This display device may also display any suitable secondary game associated with the primary game as well as information relating to the primary or secondary game. The alternative embodiment shown in FIG. 2B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. The gaming device includes a credit display that displays a player's current number of credits, cash, account balance or the equivalent. In one embodiment, the gaming device includes a bet display that displays a player's amount wagered. In one embodiment, as described in more detail below, the gaming device includes a player tracking display that displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD), a display based onlight-emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one, and preferably a plurality of, game or other suitable images, symbols and indicia, such as any visual representation or exhibition of the movement of objects, such as mechanical, virtual or video reels and wheels, dynamic lighting, video images, images of people, characters, places, things and faces of cards, and the like.

In one alternative embodiment, the symbols, images and indicia displayed on or off the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor 12.

A payment device such as a payment acceptor includes a note, ticket or bill acceptor, wherein the player inserts paper money, a ticket or voucher, and a coin slot where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen 42 and the touch-screen controller 44 are connected to a video controller 46. A player can make decisions and input signals into the gaming device by touching the touch-screen 42 at the appropriate places. One such input device is a conventional touch-screen button panel.

The gaming device may further include a plurality of communication ports for enabling communication of the processor 12 with external peripherals, such as external video sources, expansion buses, game or other displays, an SCSI port or a key pad.

In one embodiment, as seen in FIG. 2A, the gaming device includes a sound-generating device controlled by one or more sound cards 48 that function in conjunction with the processor 12. In one embodiment, the sound-generating device includes at least one and preferably a plurality of speakers 50 or other sound-generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor 12 (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split-screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game if the poker game described herein is implemented as a bonus or secondary game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

Figure 2B:
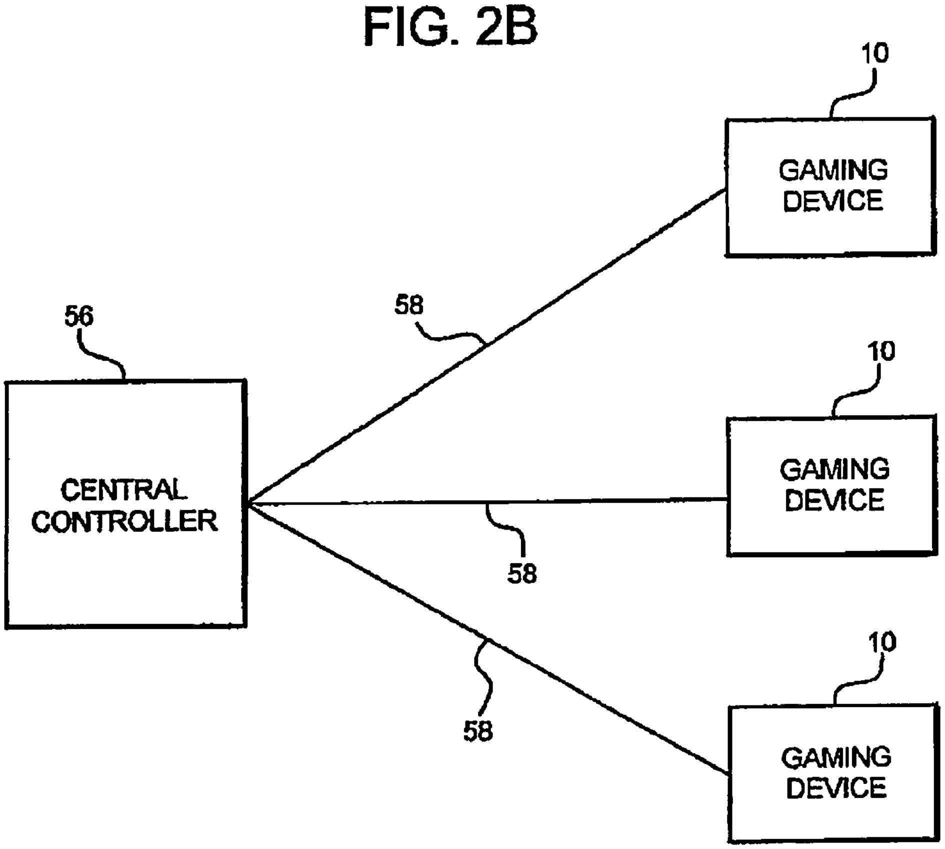
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device, which includes at least one processor and at least one memory or storage device. In such different embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

There are hundreds of available computer languages that may be used to implement embodiments of the invention, among the more common being Ada, Algol, APL, awk, Basic, C, C++, Cobol, DELPHI®, Eiffel, EUPHORIA®, Forth, Fortran, HTML, Icon, JAVA®, JAVASCRIPT®, Lisp, Logo, MATHEMATICA®, MATLAB®, MIRANDA®, Modula-2, OBERON®, Pascal, PERL®, PUI, PROLOG®, PYTHON®, Rexx, SAS®, Scheme, sed, Simula, Smalltalk, Snobol, SQL, Visual Basic, Visual C++, and XML.

Any commercial processor may be used to implement the embodiments of the invention, either as a single processor, serial or parallel set of processors in the system. Examples of commercial processors include, but are not limited to MERCED™, PENTIUM®, PENTIUM II™, XEON®, CELERON®, PENTIUM PRO™, EFFICEON®, Athlon, AMD and the like.

Display screens may be segment display screen, analogue display screens, digital display screens, CRTs, LED screens, plasma screens, liquid crystal diode screens, and the like.

It will be understood that this implementation is merely illustrative. For example, there could be more or less reels with scatter symbols. The reels selected for the example are purely illustrative. Embodiment of the present invention can be readily added to existing games with modifications as required.

The term "reels" should be understood to include games in which symbols are arranged in different geometric patterns, with specific groups of symbols that move in a coordinated way being considered as reels.

This invention relates to the field of casino wagering apparatus, especially video slot apparatus and to the provision of jackpots triggered by scattered symbols on a gaming machine. The invention has been developed primarily for use with linear progressive jackpots and will be described hereinafter with reference to this application. However, it will be appreciated that the invention is not limited to this particular field of use.

It will be appreciated that the present invention is of broad application, and can be implemented in a variety of ways. Variations and additions are possible within the general scope of the present invention.

The invention claimed is:

1. A method of playing a wagering game in a slot machine, the method comprising:

determining by a processor an amount of a wager accepted for a wagering game of a slot machine;

determining by the processor of the slot machine whether at least one symbol on a plurality of reels is displayed by the slot machine as having one of an active state and an inactive state, wherein the determination has a probability of choosing the active state based on a ratio of the determined amount of the accepted wager relative to a maximum allowable wager amount for the slot machine; and determining by the processor a jackpot winning event for the wagering game by considering only symbols displayed as having an active state.

2. The method of claim 1, wherein determining the jackpot winning event comprises determining, if symbols displayed as having an active state appear across the plurality of reels in a predefined manner for the jackpot winning event, and if so then paying a jackpot amount according to at least one of a total number of symbols and a location of the symbols displayed as having an active state.

3. The method of claim 2, wherein the jackpot winning event has a probability that is linearly dependent upon the size of the accepted wager relative to the maximum allowable wager, and the probability of each symbol being displayed as having an active state is independently based upon the size of the accepted wager.

4. The method of claim 3, wherein the symbols displayed as having an inactive state are operative for determination of a winning outcome in non-jackpot game play.

5. The method of claim 2, wherein the jackpot amount is a progressive jackpot amount that is accumulated from wagers placed across a plurality of linked slot machine.

6. The method of claim 2, wherein the jackpot amount is accumulated from wagers placed on a single slot machine.

7. A system for operating a linked jackpot, the system comprising a plurality of slot machines linked to a central jackpot controller, the central jackpot controller and the plurality of slot machines configured to cooperate to:

determine an amount of a wager accepted by a wagering game;

determine whether at least one symbol on a plurality of reels is displayed by each slot machine as having one of an active state and an inactive state, wherein the determination has a probability of choosing the active state based on a ratio of the determined amount of the accepted wager relative to a maximum allowable wager amount for each slot machine; and determine a jackpot winning event considering only symbols displayed as having an active state.

8. A slot machine, including:

a plurality of reels for displaying a plurality of symbols;

a processor; and a selector for providing wager selection options, wherein the processor is configured to execute a game in accordance with software, wherein executing the game includes:

the slot machine accepting a wager on a jackpot game on the slot machine;

incrementing with the processor a total amount of a jackpot using at least a portion of the wager;

determining with the processor an amount of the accepted wager;

displaying the plurality of symbols on the reels, wherein the plurality of symbols are randomly displayed as variable state symbols on the reels, wherein variable state symbols are displayed as having either an active state or an inactive state, wherein displaying each of the plurality of symbols as having either an active state or an inactive state is probabilistically determined by the slot machine on a basis relative to the determined size of the accepted wager relative to a maximum allowable wager; and determining with the processor a jackpot winning event considering only the plurality of symbols that are displayed as having an active state.

9. The slot machine of claim 8, wherein the probability of winning the jackpot winning event is linearly dependent upon the size of the accepted wager relative to the maximum allowable wager for slot machine.

10. The slot machine of claim 8, wherein symbols displayed as having an inactive state are operative for non-jackpot game play.

11. The slot machine of claim 8, wherein the probability of the symbols being displayed as having an active state is dependent upon the size of the accepted wager relative to the maximum allowable wager, and wherein the probability of each of the symbols being displayed as having an active state is independently based upon the size of the accepted wager.

12. A system for operating a linked jackpot game, the system comprising a plurality of slot machines configured according to claim 8, the plurality of slot machines being linked to a central jackpot controller, wherein the central jackpot controller and the plurality of slot machines cooperate to provide a pooled jackpot incremented from wagers on all of the plurality of slot machines.

13. A method of providing a jackpot of a total amount of award at a time of resolving wagers in a slot machine having a plurality of reels, the slot machine executing a method comprising:

accepting a wager on the outcome of the reels, the wager being an amount within a range of predetermined wagers from a lowest allowable wager amount of 1 credit up to a maximum allowable number of credits that is greater than 1;

determining by a processor the amount of the accepted wager;

executing by a processor a game such that the plurality of reels assume a random configuration displaying a plurality of symbols on the plurality of reels; and determining by a processor if at least one symbol of the plurality of symbols appears across at least one of the plurality of reels as having one of an active state and an inactive state in an active reel when determining the outcome of the simulated reels, wherein only symbols having an active state are considered in the determination of paying at least a portion of a jackpot, the portion of the jackpot paid being dependent on an amount of the accepted wager within the range, with a lower portion of the jackpot being paid for lower numbers of credits accepted within the range and a higher portion being paid for higher numbers of credits accepted within the range.

14. The method of claim 13, wherein the portion of the jackpot paid is proportional to the ratio of the accepted wager to the maximum wager.

15. The method of claim 14, wherein the portion of the jackpot paid is at least one of directly proportional and linearly proportional to the ratio of the accepted wager to the maximum wager.

16. The method of claim 15, wherein the entire jackpot is paid when the accepted wager is the maximum wager.

17. A method of playing a jackpot wagering game in a slot machine configured to display a plurality of symbols, the method comprising:

the slot machine accepting a wager on a jackpot game of the slot machine;

the slot machine incrementing a total amount of a jackpot using at least a portion of the accepted wager;

the slot machine determining an amount of the accepted wager; and the slot machine executing software to play the jackpot game by displaying the plurality of symbols, wherein at least some symbols of the plurality are randomly provided as variable state symbols on the reels, wherein the variable state symbols are symbols that are displayed as having one of an active state and an inactive state, and wherein only symbols displayed as having an active state are considered in the determination of jackpot winning events, and wherein display of the variable state symbols as having one of an active state and an inactive state is probabilistically determined on a basis associated with the determined amount of the accepted wager with a greater amount of the accepted wager resulting in a greater probability for the variable state symbols being displayed as having an active state.

18. The method of claim 1, wherein a determination for which symbol displayed for the at least one symbol is different than the determination of whether or not the symbol is displayed as having one of an active state and an inactive state.

19. The slot machine of claim 8, wherein the slot machine is a video slot machine, and wherein the plurality of reels are virtual reels of the video slot machine.

20. The method of claim 13, wherein the at least one symbol has its own probability for the symbol to be shown that is independent of a probability used to determine whether or not the at least one symbol is displayed as having one of an active state and an inactive state.

21. The method of claim 17, wherein the variable state symbols are displayed on the reels as having a symbol regardless of the displayed state.

22. The method of claim 17, wherein at least some symbols of the plurality are provided as single state symbols having only an active state.

23. A method of playing a wagering game in a slot machine, the method comprising:

determining a plurality of symbols to be displayed by a plurality of reels; and determining by a processor if at least one symbol of the plurality is to be displayed as having one of an active state and an inactive state and displaying the at least one symbol according to the determination, wherein the determination of the at least one symbol to be displayed and the determination as to having one of an active state and an inactive state are both probabilistically determined but are independent determinations of each other.

24. The method of claim 23, wherein determining if the at least one symbol of the plurality is to be displayed as having one of an active state and an inactive state is based on a probability that increases the probability to have an active state as a wager amount increases.

25. The method of claim 23, further comprising determining if a plurality of symbols of the plurality are to be displayed as having one of an active state and an inactive state with a total probability having an active state being distributed among symbols of different reels.

* * * * *

UNITED STATES PATENT AND TRADEMARK OFFICE

CERTIFICATE OF CORRECTION

PATENT NO. : 9,171,423 B2
APPLICATION NO. : 12/012230
DATED : October 27, 2015
INVENTOR(S) : Terry O'Halloran et al.

It is certified that error appears in the above-identified patent and that said Letters Patent is hereby corrected as shown below:

In the specification:

| | | | |
|---|---|---|---|
| | COLUMN 9, | LINE 21, | change "based onlight-emitting" to --based on light-emitting-- |

In the claims:

| | | | |
|---|---|---|---|
| CLAIM 2, | COLUMN 12, | LINE 66, | change "determining, if" to --determining if-- |
| CLAIM 5, | COLUMN 13, | LINE 17, | change "slot machine." to --slot machines.-- |
| CLAIM 9, | COLUMN 13, | LINE 64, | change "wager for slot" to --wager for the slot-- |
| CLAIM 19, | COLUMN 15, | LINE 12, | change "of reels are" to --of reels is-- |

Signed and Sealed this
Twenty-ninth Day of March, 2016

Michelle K. Lee

Michelle K. Lee
*Director of the United States Patent and Trademark Office*